United States Patent Office 3,489,009
Patented Jan. 13, 1970

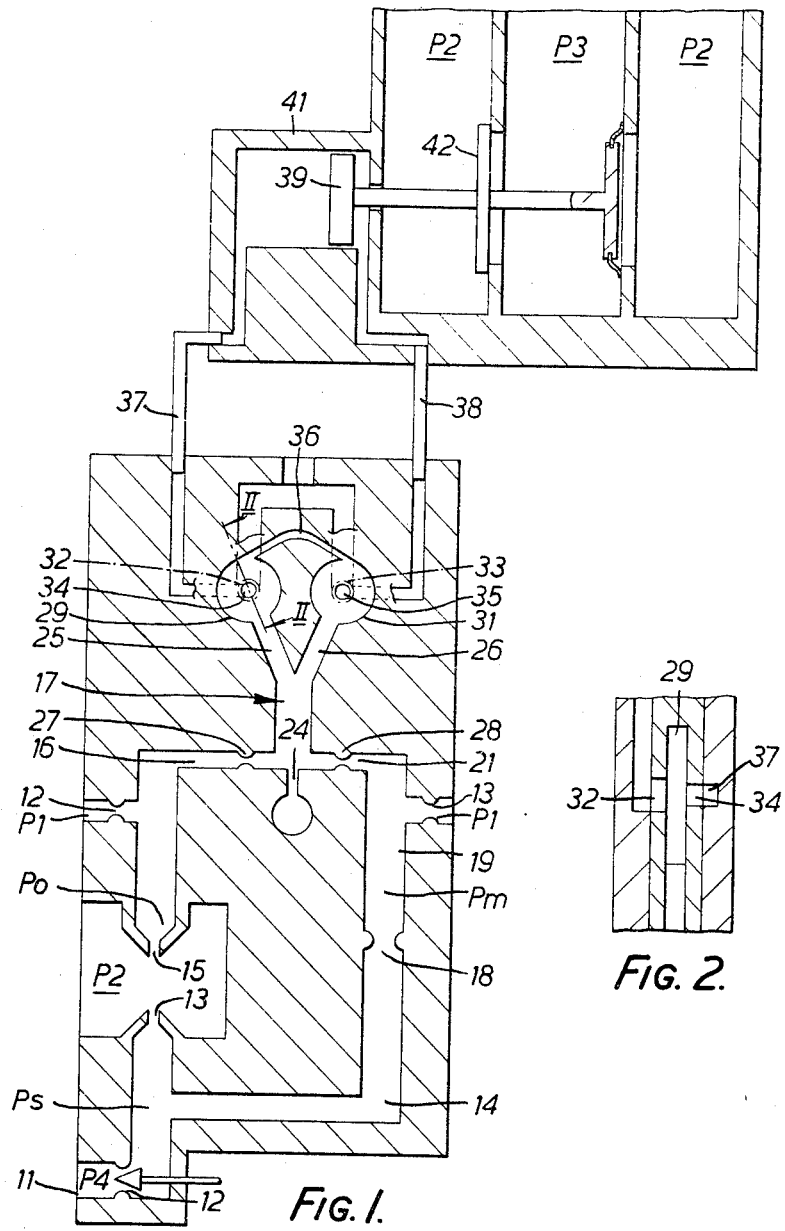

3,489,009
PRESSURE RATIO SENSING DEVICE
Ronald Rimmer, Cheltenham, England, assignor to Dowty Fuel Systems Limited, Cheltenham, England, a British company
Filed May 9, 1968, Ser. No. 727,781
Claims priority, application Great Britain, May 26, 1967, 24,501/67
Int. Cl. G01l 7/00
U.S. Cl. 73—388          6 Claims

ABSTRACT OF THE DISCLOSURE

A device for sensing a pneumatic pressure ratio has a discharge nozzle across which the pressure ratio is in excess of 1.89 whereby the discharge flow is sonic, and a receiver nozzle spaced axially from the discharge nozzle. By suitable spacing of the discharge and receiver nozzles, the pressure in the latter nozzle will remain near a constant value as pressure ratio increases, until the pressure ratio reaches a critical value. Beyond this point, receiver nozzle pressure falls steeply with increase in pressure ratio, and the sudden change is compared with the pressure change across a matching restrictor to provide an output signal which is used for measurement or control purposes. A pre-determined ratio between two sources of fluid pressure, which is different from the critical pressure ratio across the nozzle, can be sensed by putting a suitable restrictor in the supply from the source of higher pressure to the nozzle, so that the output signal occurring when nozzle pressure ratio passes the critical value, indicates attainment of the pre-determined ratio between the two sources.

BACKGROUND OF THE INVENTION

Field of the invention

Pneumatic pressure ratio detectors particularly, though not exclusively, for use with gas turbine engines.

Description of the prior art

One previously known method of measuring pressure ratio depends upon the change of pressure with flow across an orifice at the choked condition when the flow is sonic. The method uses a fixed orifice and a variable orifice through which pneumatic fluid flows from a source under the higher of the two pressures, while the pressure between the orifices is compared with the lower of the two pressures by fluid operated servo-mechanism which varies the area of the variable orifice to maintain the choked condition of the fixed orifice. The area of the variable orifice then varies in accordance with the pressure ratio, and the movement of an element of the servo-mechanism which regulates said area can be used to signal the pressure ratio.

SUMMARY OF THE INVENTION

The present invention, which is particularly concerned with measuring a pre-determined pressure ratio, provides the possibility of an output signal which is more sensitive to change of pressure ratio in the region of the critical value, and which is derived without the use of moving parts.

According to the present invention a device for sensing the ratio of a first pneumatic pressure and a second pneumatic fluid pressure, comprises a discharge nozzle arranged to be supplied with one pressure at its inlet and a second, lower, pressure at its outlet, said inlet and outlet pressures being derived from the respective sources of said first and second fluid pressures, and having a ratio which is proportional to the ratio of the first and second fluid pressures, a receiver nozzle axially spaced from the discharge nozzle to receiver fluid discharged therefrom, a matching receiver to which the fluid supplying the discharge nozzle is connected through a restrictor, and a comparator arranged to provide a variable power output which is controlled in dependence upon both the pressure in the receiver nozzle and the pressure in the matching receiver.

The device is less effective for sensing high pressure ratios because the pressure supplied to the discharge nozzle and the matching receiver must be reduced, thus reducing the pressures which control the comparator. In order to extend the useful range of the device to higher pressure ratios there may be provided two sensing stages.

According to a further feature of the invention, therefore, the first sensing stage includes the said discharge nozzle and the said receiver nozzle, and the second sensing stage comprises a second stage discharge nozzle arranged to be supplied with fluid from the source of said first fluid pressure at a pressure above that at the inlet of the first stage nozzle, a second stage receiver nozzle axially spaced from the second stage discharge nozzle, the second stage receiver nozzle having a controlling connection to the comparator, a chamber defining the spaced between the second stage discharge and receiver nozzles, and means connecting the first stage receiver nozzle to the chamber whereby the second sensing stage is responsive to pressure change in the first stage receiver nozzle.

For sensing even higher pressure ratios there may be provided three successive sensing stages.

BRIEF DESCRIPTION OF THE DRAWINGS

FIGURE 1 illustrates one embodiment of the invention,

FIGURE 2 shows an enlarged detail on the section line II—II of FIGURE 1,

DESCRIPTION OF THE PREFERRED EMBODIMENT

Figure 3:
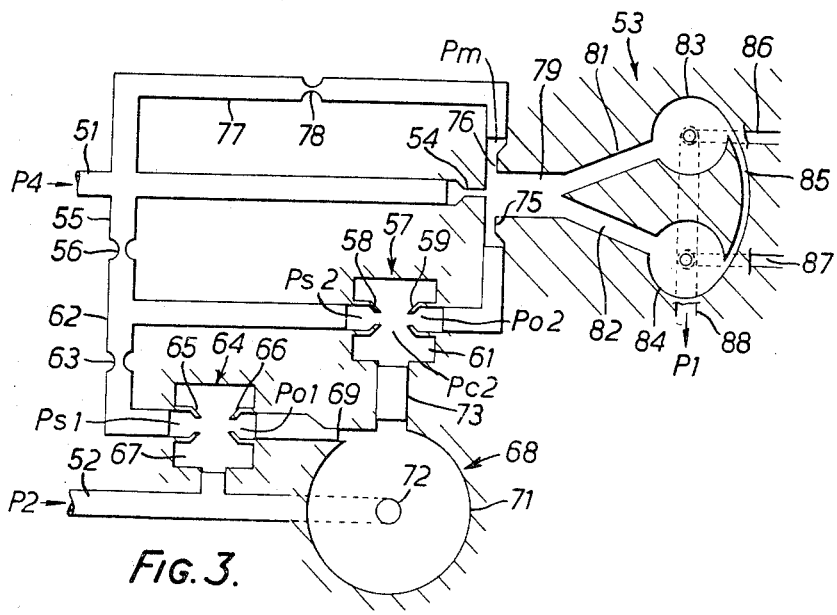
FIGURE 3 illustrates another embodiment of the invention.

The invention is illustrated in FIGURE 1 with reference to a gas turbine engine in which the device controls a servo-motor-operated compressor bleed valve. A first pneumatic pressure, indicated as P4, is fed to an inlet 11 which opens through an adjustable restrictor 12 to a discharge nozzle 13 and to a duct 14. A second, lower, pneumatic pressure, indicated as P2, is fed to the discharge side of the nozzle 13 and also to the inlet side of a receiver nozzle 15 which is axially spaced from the nozzle 13. A continuation from the receiver nozzle 15 forms one control passage 16 for a jet deflection device which, in this embodiment is a fluid switch 17. The duct 14, opens through a fixed restrictor 18 into a matching receiver 19, the continuation of which forms a second control passage 21 for the fluid switch. The receiver nozzle 15 and the second receiver 19 are connected through fixed restrictors 12 and 13 respectively to a region which is at a third pneumatic pressure P1, lower than the pressure P2.

The fluid switch forms a comparator responsive to the pressures in the control passages 16 and 21. The switch is of the kind having an high pressure recovery output as described in United States patent application Ser. No. 649,068 filed June 8, 1967 to which reference can be made for details. The fluid switch has a power jet nozzle 24 from which an issuing power jet is deflectable into one or other of two outlet passages 25, 26 under the control of fluid pressures in the control passages 16 and 21. Fixed restrictors 27, 28 are provided in the respective passages. The outlet passages 25, 26 open radially into vortex chambers 29, 31, which have power outlets 32, 33 respectively and vents 34, 35 respectively on their central axes, while an inter-connecting passage 36 has end portions which open tangentially and peripherally into the respective chambers 29, 31.

The power outlets 32, 33 are connected by passages 37, 38 to opposite ends of servomotor piston 39 which is slidable in a cylinder 41. The piston 39 operates the movable member 42 of a bleed valve which is operable to bleed air at a pressure P3 from one turbine stage to a lower pressure P2 in a previous turbine stage, thus reducing the air mass flow through the engine.

FIGURE 2 shows on a larger scale in cross-section the arrangement of the power outlet 32 and the vent 34 on opposite sides of the vortex chamber 29. The area of the vent 34 is less than that of the nozzle 24 so that when the power jet from the latter flows radially across the vortex chamber 29, the recovered pressure in the outlet passage 25 is substantially maintained in the power outlet 32. The vent 34 prevents instability of the fluid switch when there is no flow through the power outlet 32.

Figure 5:
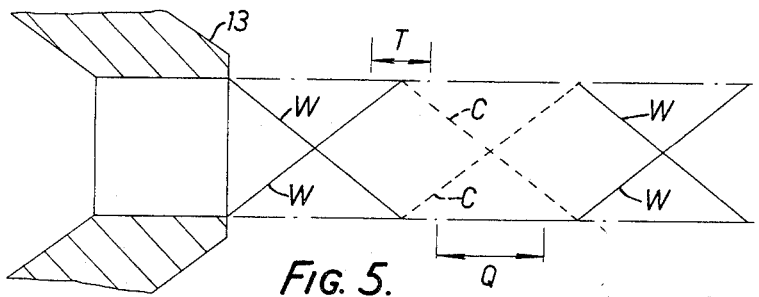
FIGURE 5 shows the shock wave pattern in a fluid stream from a discharge nozzle.
Figure 6:
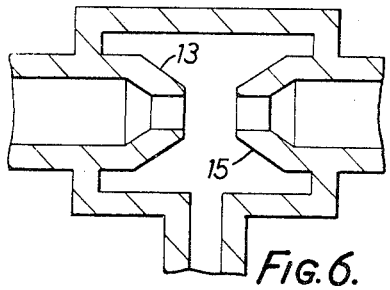
FIGURE 6 shows an arrangement of a discharge nozzle and a receiver nozzle as used in FIGURES 1, 3 and 4.

Before describing the operation of the device, the properties of the nozzles 13 and 15 will be discussed with reference to FIGURES 5, 6 and 7. When the pneumatic pressure ratio between the inlet and discharge sides of the nozzle 15 exceeds 1.89, the flow from the nozzle is sonic and contains alternate expansion waves W and compression waves C which are reflected at the lateral boundaries of the jet, and which will appear in a Schlieren photograph as a diamond pattern. If the receiver nozzle 15 is disposed along the axis of the jet, the pressures recovered in the receiver nozzle will vary in non-linear fashion according to its distance from the discharge orifice. If the entry to the receiver nozzle 15 is disposed in the "quiescent" zone Q which is associated with waves crossing at the jet stream centre line, the recovered pressure will be constant or rising. If on the other hand the entry to the receiver nozzle 15 is disposed in the "turn-down" zone T which is associated with waves reflected from the jet stream boundary, the recovered pressure will be low or falling.

If the receiver nozzle 15 is fixedly spaced from the discharge nozzle 13 so that at pressure ratios $Ps/P2$ not greatly exceeding 1.89, the receiver nozzle entry is in the quiescent zone, there will be substantial recovery of pressure. If the pressure ratio $Ps/P2$ is progressively increased, the diamond wave pattern will extend concertina fashion whereby the "turn-down" zone advances towards the receiver nozzle entry to cause a sudden fall of pressure therein.

In practise it has been found that the minimum useful pressure ratio giving a sharply defined turn-down of pressure recovered, is of the order of 3:1 while the corresponding spacing between the nozzles is 1.6 multiplied by the diameter of the discharge nozzle. For this example, FIGURE 7 is a graph showing the relationship of $Po/Ps$ as ordinate, and $Ps/P2$ as abscissae wher $Ps$ is the pressure in the discharge nozzle 13, while $Po$ is the static pressure in the receiver nozzle 15.

If $Pm$ is the pressure in the matching receiver 19, the quotient $Pm/Ps$ will be substantially constant as $Ps/P2$ varies, as shown by the broken line. The position at which the broken line crosses the unbroken curve can be selected by suitable initial adjustment of the restrictors 18, 12 and 13. Thus, the pressure in the control passage 16 of the fluid switch 17 exceeds that in the control passage 21 when the pressure ratio $Ps/P2$ is below the critical value, which is of the order of 3:0, while the pressure in the control passage 21 exceeds that in the control passage 16 when the pressure ratio is above the critical value.

The arrangement in FIGURE 1 is intended to prevent compressor surge in the engine, which is liable to occur before a pre-determined ratio of the first pressure P4 to the second pressure P2 is attained. This pre-determined ratio of $P4/P2$ is not the same as the critcial pressure ratio of $Ps/P2$, but the restrictor 12 can be adjusted until the critical value of $Ps/P2$ is reached when $P4/P2$ is at the pre-determined value.

At low pressure ratios of $P4/P2$, the corresponding ratio $Ps/P2$ being less than 3.0, the power jet from the nozzle 14 of the fluid switch 7 is therefore deflected by the higher pressure in the control passage 16 into the outlet passage 26 whereby there is a higher pressure at the power outlet 35 than at the power outlet 34. The piston 39 is therefore moved by the higher pressure in the passage 38 to open the bleed valve 42, whereby the air mass flow through the gas turbine engine is reduced.

When the pressure ratio $P4/P2$ rises above the pre-determined value, the pressure ratio $Ps/P2$ also rises above the critical value. The pressure in the matching receiver 19 and control passage 21 rises above that in the nozzle 15 and control passage 16 so that the power jet from the nozzle 14 is then deflected into the outlet passage 25, whereby pressure at the power outlet 34 exceeds that at the power outlet 35. The piston 39 then moves under the higher pressure in the passage 37 to close the bleed valve.

The power jet nozzle 24 is supplied with the pneumatic pressure P4 from the engine, so that the air bleed valve is controlled and operated solely by the prevailing pressures at the various compressor stages.

Figure 7:
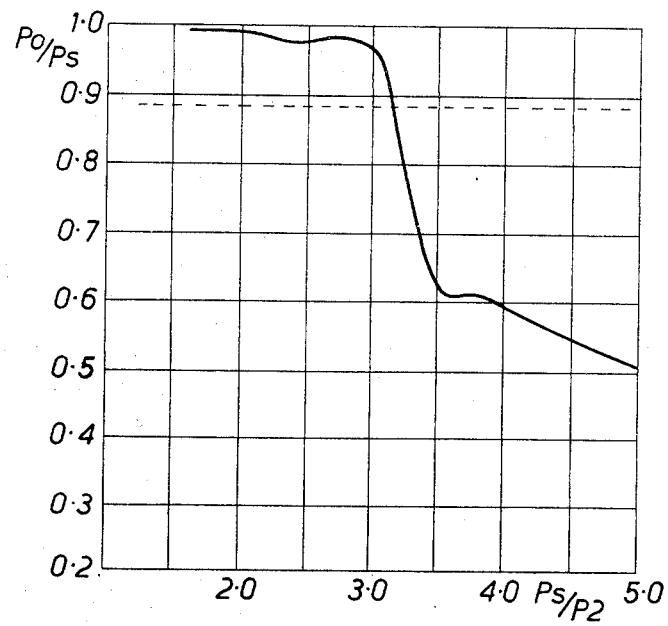
FIGURE 7 is a graph showing the relationship between receiver nozzle pressure and pressure ratio across the discharge nozzle.

While the jet deflection device 17 has been described as having a switching function, it may be constructed as a fluid amplifier so that the pressure difference in the power outlet passages 37, 38 is proportional to the pressure ratio $Ps/P2$ over the substantially straight portion of the curve of FIGURE 7 in the turn-down zone.

Figure 8:
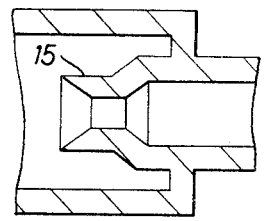
FIGURE 8 shows a modification of the receiver nozzle.

The modified form of receiver nozzle 15, shown in FIGURE 8 to have a flared entry, provides a steeper turn-down characteristic of the curve and is thus more suited to a switching action of the jet deflection device 17.

The device of FIGURE 3 has input pipes 51, 52 supplied with the first pressure P4 and the second pressure P2 respectively. The pipe 51 supplies the power jet nozzle 54 of a jet deflection device 53, and it has a branch 55 with a restrictor 56 therein supplying the discharge nozzle 58 of a second sensing stage 57. A further branch 62 having a restrictor 63 therein supplies the discharge nozzle 65 of a first sensing stage 64. A receiver nozzle 66 is axially spaced from the nozzle 65 across a chamber 67 which is supplied with pressure P2 from the pipe 52.

The receiver nozzle 66 leads to an orifice 69 which opens tangentially into the chamber 71 of a vortex device 68. The pipe 52 is connected to a central opening 72 in the chamber 71. A passage 73 opens radially from the chamber 71 to a chamber 61 of the secondary pressure ratio senser 57, across which a receiver nozzle 59 is spaced from the discharge nozzle 58.

The receiver nozzle 59 leads to a control orifice 75 on one side of the power jet nozzle 54. A control orifice 76 on the other side is supplied with fluid from the pipe 51 by a branch pipe 77 having a restrictor 78 therein. The device 53 is formed as a fluid switch having an interaction chamber 79 into which the nozzle 54 opens and from which two outlet passages 81, 82 lead radially into respective vortex chambers 83 and 84. An interconnecting passage 85 opens tangentially into these chambers. The chambers are provided with central openings leading to respective outlet pipes 86 and 87, and also with central openings of slightly larger diameter having a common outlet pipe 88 connected to a low pressure part of the system which may be designated P1.

The value of the restrictors 56 and 63 is such that the ratio of pressure $Ps1$ in the discharge nozzle to pressure P2 in the chamber 67 becomes critical when the ratio $P4/P2$ is at the pre-determined value. In the pre-critical condition of the first sensing stage, the pressure $Po1$ recovered in the receiver nozzle 66 causes flow through the tangential orifice 69 which produces a substantial vortex in the chamber 71, and therefore a pressure head between the periphery of the chamber and the central discharge opening 72.

A peripheral pressure $Pc2$ prevails in the chamber 61 on the discharge side of the nozzle 58. The pressure $Ps2$ in the discharge nozzle 58 is higher than that in the first stage discharge nozzle 65 because it is only reduced from P4 by the one restrictor 56. The peripheral pressure $Pc2$, nevertheless maintains the pressure ratio $Ps2/Pc2$ below the critical value.

When the pressure ratio $P4/P2$ passes the pre-determined value, the pressure ratio $Ps1/P2$ in the first sensing stage also passes the critical value, whereby the pressure $Po1$ in the receiver nozzle 66 falls. The peripheral velocity of the vortex also falls whereby the pressure $Pc2$ at the periphery of the chamber 71 and in the chamber 61 also falls. With the fall of pressure $Pc2$, the pressure ratio $Ps2/Pc2$ of the second sensing stage passes the critical value. The pressure $Po2$ which previously exceeded pressure $Pm$ in the matching receiver 79, now falls below the pressure $Pm$, whereby the power jet from the orifice 54 is deflected from the outlet passage 81 to the outlet passage 82. The resulting reversal of pressures in the outlet pipe 86 and 87 can operate a valve as in FIGURE 1 for bleeding turbine air. The apparatus can alternatively be used to control or modify fuel flow for the purpose of avoiding compressor surge.

Figure 4:
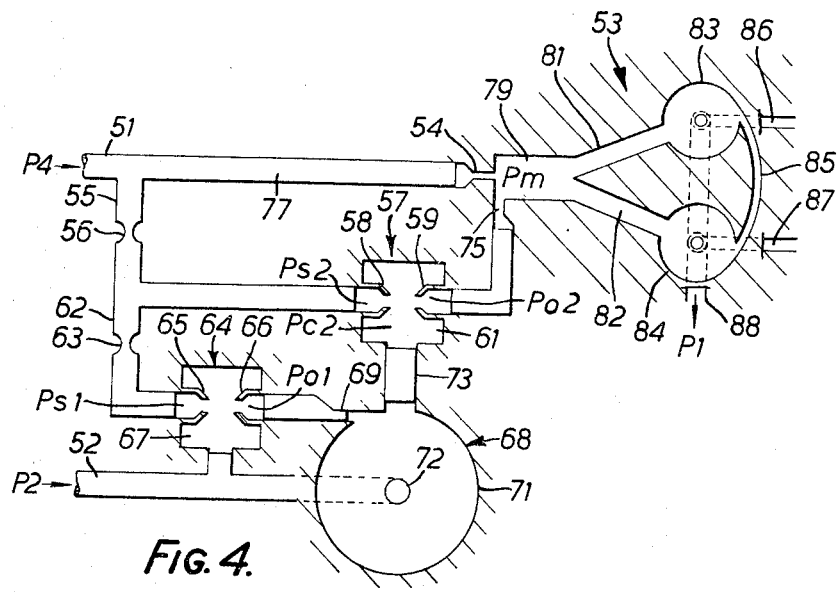
FIGURE 4 shows a modification of the embodiment of FIGURE 3.

The embodiment of FIGURE 4 is similar in most respects to that of FIGURE 3, the difference consisting in the constructing of the jet deflection device 53 as a monostable fluid switch with the orifice 75 forming the sole external control for the power jet. Under sub-critical operation, the pressure $Po2$ at the orifice 75 maintains the power jet deflected into the outlet passage 81. The power jet flowing radially into the vortex chamber 83 maintains a pressure in the outlet pipe 86 and in the connecting pipe 85 whereby a vortex is produced in the chamber 84. The pressure at the central outlet and in the pipe 87 is at the lower pressure P1 while the pressure is fed back through the outlet passage 82 to the interaction chamber 79.

The pressure in the interaction chamber 79 is derived from the supply pressure P4 and together with the pressure in the orifice 75 controls the deflection of the power jet. The interaction chamber 79 thus constitutes the matching receiver to which the source of fluid supplying both the discharge nozzle 65 and the discharge nozzle 58 is also connected through the jet nozzle 54, the latter constituting a restrictor. As the pre-determined pressure ratio of P4 to P2 is passed, the pressure $Po2$ in the orifice 75 falls with respect to that in the interaction chamber 79 and can no longer maintain the deflection of the jet into the outlet passage 81. The power jet then reverts stably to the outlet passage 82 whereby the pressures in the outlet pipe 86 and 87 is reversed.

I claim:
1. A device for sensing the ratio of a first pneumatic fluid pressure and a second pneumatic fluid pressure, comprising:
 (A) a discharge nozzle arranged to be supplied with one pressure at its inlet and a second, lower, pressure at its outlet, said inlet and outlet pressures being derived from the respective sources of said first and second fluid pressures, and having a ratio which is proportional to the ratio of the first and second fluid pressures,
 (B) a receiver nozzle axially spaced from the discharge nozzle to receive fluid discharged therefrom,
 (C) a matching receiver to which the one pressure supplying the discharge nozzle is connected through a restrictor, and
 (D) a comparator arranged to provide a variable power output which is controlled in dependence upon both the pressure in the receiver nozzle and the pressure in the matching receiver.

2. A device according to claim 1, wherein the comparator comprises a jet deflection device having a power jet nozzle opening into an interaction chamber, two outlet passages opening from the interaction chamber, and a control port connected to the receiver nozzle whereby a change of fluid pressure in the receiver nozzle resulting from a change of pressure ratio across the discharge nozzle in the region of the critical value, causes the power jet to switch from one of the outlet passages to the other.

3. A device according to claim 2, wherein the jet deflection device has a second control port which is on the other side of the power jet nozzle from the first-mentioned control port, and which is connected to the matching receiver.

4. A device according to claim 2, wherein the matching receiver is provided by the interaction chamber, and the restrictor through which fluid is supplied to the matching receiver is provided by the power jet nozzle, and wherein the jet deflection device is monostable such that the power jet will switch to the monostable outlet upon a fall in pressure at the control port.

5. A device according to claim 1, including two successive sensing stages of which:
 (A) the first sensing stage includes the said discharge nozzle and the said receiver nozzle, and of which
 (B) the second sensing stage comprises
  (1) a second stage discharge nozzle arranged to be supplied with fluid from the source of said one pressure at a pressure above that at the inlet of the first stage nozzle,
  (2) a second stage receiver nozzle axially spaced from the second stage discharge nozzle, the second stage receiver nozzle having a controlling connection to the comparator,
  (3) a chamber defining the space between the second discharge and receiver nozzles, and
  (4) means connecting the first stage receiver nozzle to the chamber whereby the second sensing stage is responsive to pressure change in the first stage receiver nozzle.

6. A device according to claim 5, wherein the connecting means comprises:
 (A) a vortex chamber,
 (B) a passage from the first stage receiver nozzle opening tangentially into the vortex chamber,
 (C) a passage opening radially from the vortex chamber and leading to the chamber between the second discharge and receiver nozzles, and
 (D) a vent at the centre of the vortex chamber which is connected to the source of said second pneumatic pressure.

References Cited

UNITED STATES PATENTS 3,270,561  9/1966  Smith _____ 73—401

DONALD O. WOODIEL, Primary Examiner

U.S. Cl. X.R.

137—81.5